United States Patent
Abthoff et al.

[11] Patent Number: 5,873,609
[45] Date of Patent: *Feb. 23, 1999

[54] DEVICE FOR CONNECTING TWO TUBULAR CONDUCTING PARTS

[75] Inventors: Jörg Abthoff, Plüderhausen; Rolf Fadini, Leutenbach; Günther Ebinger, Backnang; Günter König, Heuchlingen; Karl-Heinz Gersmann, Täserrot; August Kästner, Salem, all of Germany

[73] Assignees: Mercedes-Benz AG, Stuttgart; K.A.T. Entwicklungsgesellschaft fuer Abgasreinigung und Thermographie mbH, Backnang; ChristianBauer GmbH & Co., Welzheim, all of Germany

[ * ] Notice: This patent issued on a continued prosecution application filed under 37 CFR 1.53(d), and is subject to the twenty year patent term provisions of 35 U.S.C. 154(a)(2).

[21] Appl. No.: 572,552

[22] Filed: Dec. 14, 1995

[30] Foreign Application Priority Data

Dec. 14, 1994 [DE] Germany ............... 44 44 550.4

[51] Int. Cl.⁶ ................................. F16L 27/04
[52] U.S. Cl. ................... 285/266; 285/49; 285/268; 285/420; 285/906
[58] Field of Search ................... 285/261, 267, 285/268, 266, 420, 906, 49

[56] References Cited

U.S. PATENT DOCUMENTS

| | | | |
|---|---|---|---|
| 2,443,272 | 6/1948 | Sagen | 285/261 X |
| 2,459,389 | 1/1949 | Newman | 285/261 X |
| 3,727,951 | 4/1973 | Shire et al. | |
| 4,583,768 | 4/1986 | Shigehiko et al. | 285/268 X |
| 4,854,614 | 8/1989 | Torichigai et al. | 285/268 X |
| 4,871,181 | 10/1989 | Usher et al. | 285/268 X |
| 4,874,191 | 10/1989 | Green | 285/420 X |

FOREIGN PATENT DOCUMENTS

| | | |
|---|---|---|
| 0 084 589 | 8/1983 | European Pat. Off. . |
| 0 226 573 | 6/1987 | European Pat. Off. . |
| 1006009 | 4/1952 | France . |
| 2 360 028 | 2/1978 | France . |
| 914 334 | 7/1954 | Germany . |
| 1 973 737 | 11/1967 | Germany . |
| 28 10 584 A1 | 9/1979 | Germany . |
| 2913561 | 10/1979 | Germany ............ 285/261 |
| 457357 | 11/1936 | United Kingdom ....... 285/261 |
| 603933 | 6/1948 | United Kingdom . |

*Primary Examiner*—Dave W. Arola
*Attorney, Agent, or Firm*—Evenson, McKeown, Edwards & Lenahan, P.L.L.C.

[57] ABSTRACT

The invention relates to an articulated pipe connection for two conducting parts of a motor vehicle which comprises spherical connecting pieces for joining the two conducting parts and has at least on one connecting piece a flange-shaped connecting piece abuttable axially against the latter, said connecting piece being connected with spring tension by spring means with the other connecting piece, with the connecting pieces being held together by the spring means with a pretensioning force. In order to design a device for linking two tubular connecting parts in such fashion that, with constant reliability of the pipe connection, much improved mountability of the pipe connection and a simultaneous considerable reduction in their manufacturing costs can be achieved, it is proposed according to the invention that the spring means comprise a curved washer, by which the connecting piece is simultaneously formed, and the spring means also have at least one clamp that is in an active relationship with the other connecting piece and engages the curved washer or is permanently connected therewith.

19 Claims, 4 Drawing Sheets

5,873,609

DEVICE FOR CONNECTING TWO TUBULAR CONDUCTING PARTS

BACKGROUND AND SUMMARY OF THE INVENTION

The invention relates to an articulated pipe connection for two conducting parts of a motor vehicle, said connection comprising spherical connecting pieces for linking the two conducting parts and having on at least one connecting piece a flange-shaped connecting piece axially abuttable against the latter, said connecting piece being spring-connected by a spring assembly with the other connecting piece, with the connecting pieces being held together with a pretensioning force by the spring assembly.

German Patent Document DE 1 973 737 U teaches a device of the general type for articulated connection of two tubular conducting parts, especially exhaust pipes for an exhaust line system of an internal combustion engine. The conducting parts are connected together by spherical connecting pieces, with a flange-shaped connecting piece mountable on both connecting pieces which is connected under spring tension by coil springs with the other connecting piece. The connecting pieces are held together by the spring means with a pretensioning force.

As general technical background, reference is made to the following publications: German Patent Documents DE-OS 28 10 584 and DE-PS 914 334; U.S. Pat. No. 3,727,951 and French Patent Document FR 23 60 028.

An object of the invention is to design an articulated tubular connection for linking two conducting parts in such fashion that, with constant reliability of the tubular connection with respect to the prior art, a considerably improved installation ability and at the same time a considerable reduction in manufacturing cost can be achieved.

This object is achieved according to preferred embodiments of the invention by providing an arrangement wherein the spring assembly comprises a curved washer engageable with one connecting piece and at least one clamp actively connected with the other connecting piece and engaging the curved washer.

One advantage of the pipe connection according to the invention consists in the fact that the latter can be fitted together very simply and quickly by means of the curved washers and clamps and at the same time a reliable connection can be provided for the two tubular conducting parts. Rapid assembly in the construction of exhaust systems, especially in the volumes encountered in mass production, results in a considerable reduction in manufacturing costs. In addition, the material costs of the pipe connection according to the invention are much lower than for the prior art.

In the maintenance and repair of exhaust systems with the pipe connection according to the invention it is advantageous that this connection can also be disassembled considerably more quickly than the screw connection according to the prior art.

Another important advantage of the pipe connection according to the invention is that an acoustic decoupling from the engine vibrations that are fed into the body by the suspension of the exhaust system can be accomplished in a simple fashion. This results in a reduction in vehicle noise, among other things.

Another advantage of the pipe connection according to the invention lies in the weight savings over pipe connections according to the prior art.

According to certain preferred embodiments of the invention, the simplicity of the individual components of the pipe connection is of particular advantage, since the same parts with a very simple design can be used both for the at least two clamps as well as for the two curved washers.

The design of the invention according to certain preferred embodiments provides in simple fashion an articulated pipe connection like that required for example in the exhaust systems of motor vehicles.

The design of the invention according to certain preferred embodiments makes the spring characteristic of the pipe connection adjustable.

The design of the invention according to certain preferred embodiments firstly optimally utilizes the space available beneath the floor of the motor vehicle and secondly permits a secure grip of the clamps on the curved washers.

Another advantageous structural design of the invention is achieved by using an annular body according to certain preferred embodiments. The annular body (made of graphite f or example) serves as a closure and sealing surface for the joint as well as a decoupling element and can be easily replaced if necessary. During operation of the motor vehicle, the annular body fitted to the flange makes angular movement easier.

Other objects, advantages and novel features of the present invention will become apparent from the following detailed description of the invention when considered in conjunction with the accompanying drawings.

DETAILED DESCRIPTION OF THE DRAWINGS

Figure 1:
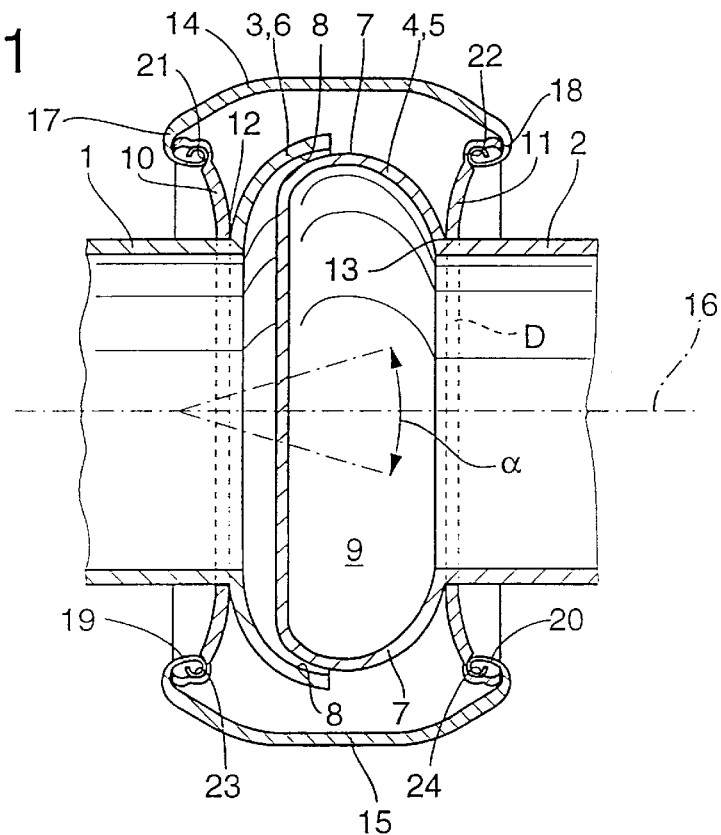
FIG. 1 is a schematic side sectional view of an articulated pipe connection constructed according to a first preferred embodiment of the invention.
Figure 2:
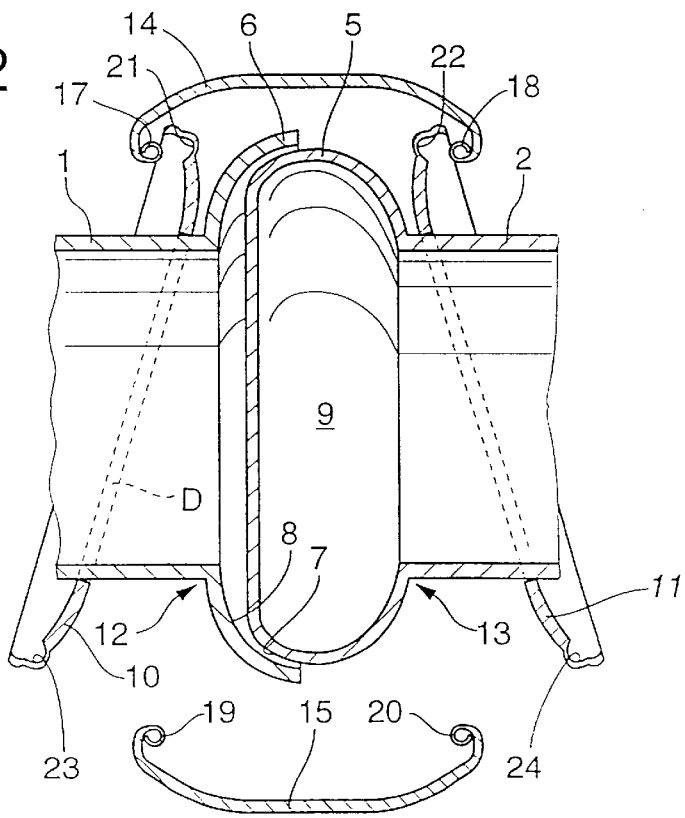
FIG. 2 is a schematic side view of the pipe connection of FIG. 1, shown in a partially assembled condition.

FIGS. 1 and 2 show in a first embodiment a device for articulated connection of two tubular conducting parts 1 and 2 with end sections 3 and 4, on each of which a spherical connecting piece 5 and 6 is formed. The two connecting pieces 5 and 6 are so designed that a spherical outer contour of connecting piece 5 and a spherical inside contour 8 of connecting piece 6 are connected in a sliding pair to form a ball joint 9. FIG. 1 shows the assembled device. FIG. 2 shows a view of the device in a partially assembled state.

On the outside wall of each of the two end sections 3 and 4, at their transition to spherical connecting pieces 5 and 6, a flange-shaped connecting piece associated with the latter is provided, said piece being designed as curved washers 10 and 11. Curved washers 10 and 11 abut the respective transition between conducting parts 1 and 2 and connecting pieces 5 and 6 in bearings 12, 13.

The two end sections 3, 4 are held together by tensioning means which in the example shown consist of two elastic clamps 14 and 25. The two curved washers 10 and 11 are surrounded externally by clamps 14 and 15. Each of clamps 14, 15 engages by its ends 17, 18 and 19, 20, recesses 21, 22 and 23, 24 provided in the radially external area of one end of curved washers 10, 11, said recesses serving to receive ends 17, 18 and 19, 20 of clamps 14, 15. Clamps 14, 15 as well as curved washers 10, 11 form spring means that hold end sections 3, 4 together with pretensioning. Connecting piece 5 is therefore actively connected with connecting piece 6 by flange-shaped connecting pieces (curved washers 10, 11) and clamps 14, 15 engaging them.

Clamps 14, 15 can preferably consist of spring-elastic material, but can also be made rigid. In addition, instead of clamps, bolts or other similar tensioning means may be used. As far as assemblability is concerned, however, clamps are especially advantageous for the pipe connection described.

Clamps 14, 15 have a clamp section that is convex in the direction of a lengthwise axis 16, with the two ends 17, 18 and 19, 20 of clamps 14 and 15 having bent crimps in the direction of recesses 21, 22 and 23, 24, said crimps engaging recesses 21, 22 and 23, 24 of curved washers 10 and 11.

With ball joint 9, formed by spherical connecting pieces 5, 6, angular movement of the two conducting parts 1, 2 relative to one another around lengthwise axis 16 as well around a vertical axis and a transverse axis is made possible, with a possible pivot angle α for the angular movement of the two conducting parts 1, 2 being in the range from 0 to 40 degrees.

For reasons of space, curved washers 10 and 11 are preferably made oval.

To produce a predetermined pressure force of curved washers 10, 11 acting on ball joint 9, clamps 14, 15 are distributed around the circumference of curved washers 10, 11.

Curved washers 10, 11 have a central opening D for tubular conducting parts 1 and 2 to pass through.

In an alternative embodiment of the invention (similar to FIG. 3), clamp 15 can be permanently connected with curved washer 10 and clamp 14 permanently connected with curved washer 11. Spring-elastic clamps 14, 15 then each have one free clamp end by which clamps 14, 15 can be clipped onto the respective opposite curved washers 11 and 10.

Assembly of the device is shown in FIG. 2. Initially, conducting parts 1, 2 are pushed together. Then the two curved washers 10, 11 are pressed together on the side facing clamp 14 and first clamp 14 is installed. Then curved washers 10, 11 are pressed together on the opposite side with the aid of a tensioning device and clamp 15 is installed. After clamp 15 is installed the tensioning device is released and the two conducting parts 1, 2 are now linked together with articulation.

Figure 1A:
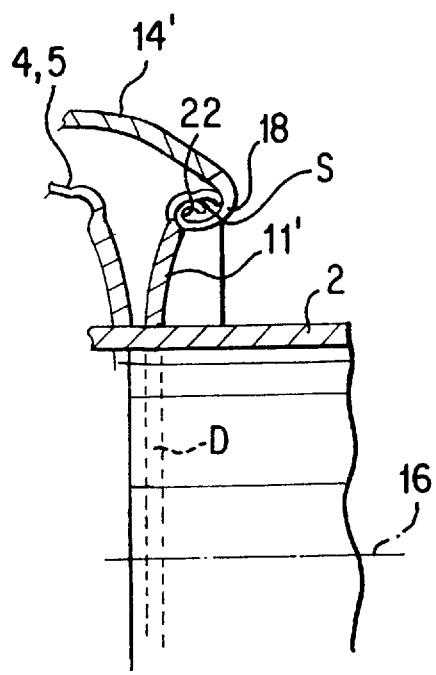
FIG. 1A is a schematic partial sectional view depicting a modified embodiment with series arranged curved washers.

FIG. 1A schematically depicts an alternative embodiments with a plurality of curved washers 11', 11A arranged in series to form a serial spring arrangement. The washer 11' is integrally formed with clamp 14' as they are connected at S.

Figure 3:
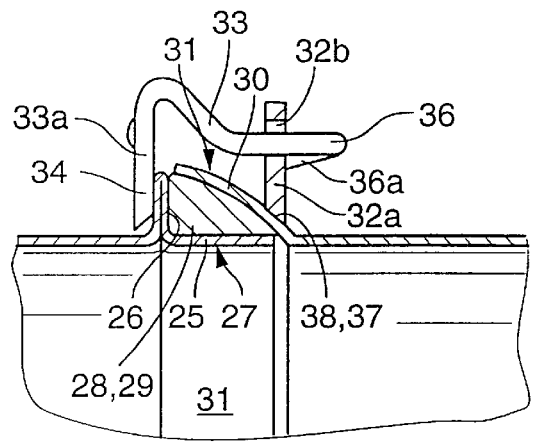
FIG. 3 is a partial schematic side sectional view of an articulated pipe connection constructed according to a second preferred embodiment of the present invention.
Figure 4:
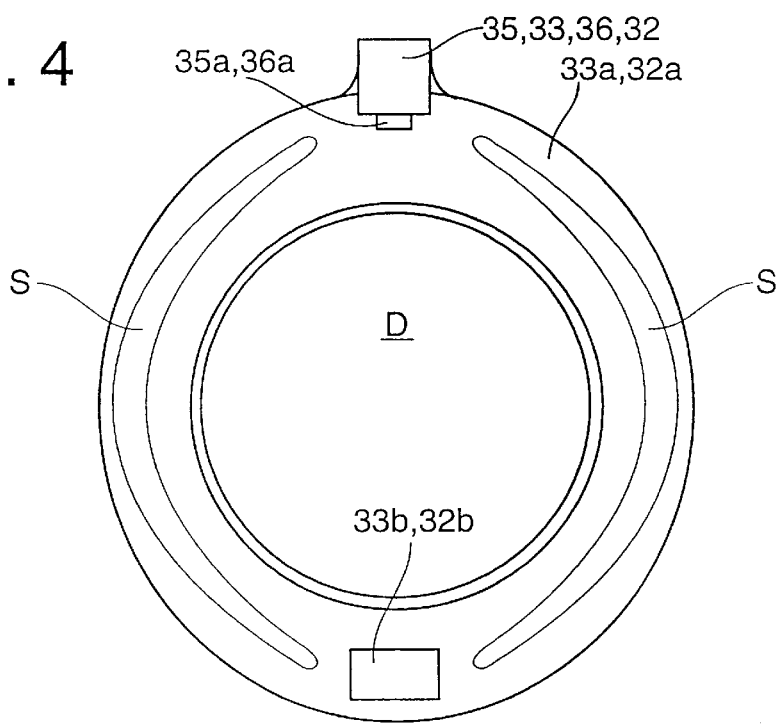
FIG. 4 is a first view of the clamp of FIG. 3.
Figure 5:
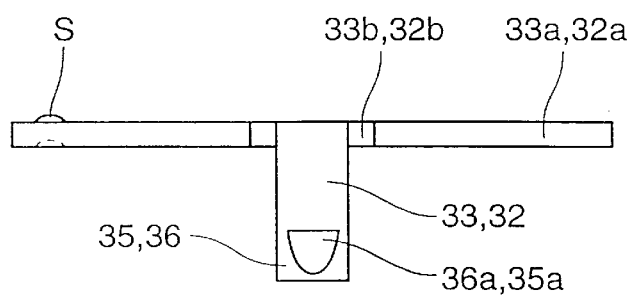
FIG. 5 is a second view of the clamp of FIGS. 3 and 4.

FIGS. 3 to 5 show a second embodiment of the invention. A first connecting piece 25 with stop 26 together with a section 27 of connecting piece 25 forms a receptacle 28 for an annular body 29 whose outer contour is adapted to the inside contour of a second connecting piece 30 and forms a joint 31 therewith. Annular body 29 preferably consists of graphite, but can also be made from another suitable sealing material with good wear properties.

A first flange-shaped connecting piece, designed as a curved washer 33a with one end 34, can abut first connecting piece 25, with a clamp 33 being permanently attached to curved washer 33a and with a clamp receptacle 33b (see FIG. 4) being located in curved washer 33a on the side opposite clamp 33.

A second flange-shaped connecting piece is abuttable against second connecting piece 30, said connecting piece being formed as a curved washer 32a similar in design to curved washer 33a in addition to a clamp 32 (see FIG. 4) permanently connected therewith. Curved washer 32a can abut a contour 38 of connecting piece 30.

In FIG. 4, the reference numerals for both curved washers 32a and 33a have been used next to the parts that are permanently connected with them.

On ends 35 and 36 of clamps 32 and 33, noses 35a and 36a are provided which can be clipped into clamp receptacles (nose receptacles) 33b and 32b. During the connection of the two connecting pieces 25 and 30, therefore, curved washers 32a and 33a are staggered 180° with respect to one another so that when the two curved washers 33a and 32a are pressed together, nose 35a of clamp 32 can clip into nose receptacle 33b of curved washer 33a and nose 36a of clamp 33 can clip into nose receptacle 32b of curved washer 32a.

Here the clamping means are formed by clamp 32 which is made in one piece with curved washer 32a and clamp 33 which is made in one piece with curved washer 33a.

To protect the surface of connecting piece 30, curved washer 32a has a bevel 37 adapted to the spherical contour 38 of the second connecting piece 30 in the vicinity of the support surface of curved washer 32a.

In the embodiment shown, only two clip connections are described. Alternatively, several clip connections (more than two) can be provided in addition by a plurality of clamps distributed uniformly around the circumference and permanently attached to the curved washers.

In another embodiment of the invention it is also contemplated for a rigid pressure disk to be pressable against the second connecting piece 30 instead of curved washer 32a, and the connection of the two connecting pieces 25, 30 is made only by clamp 33 which is permanently attached to curved washer 33a, with curved washer 33a being abuttable against first connecting piece 25 and clamp 33 being clippable by means of nose 36a into a nose receptacle on the pressure disk. In turn, several clamps 33 with noses 36a can be located on curved washer 32a, said clamps being clippable onto nose receptacles on the pressure disk.

Figure 6:
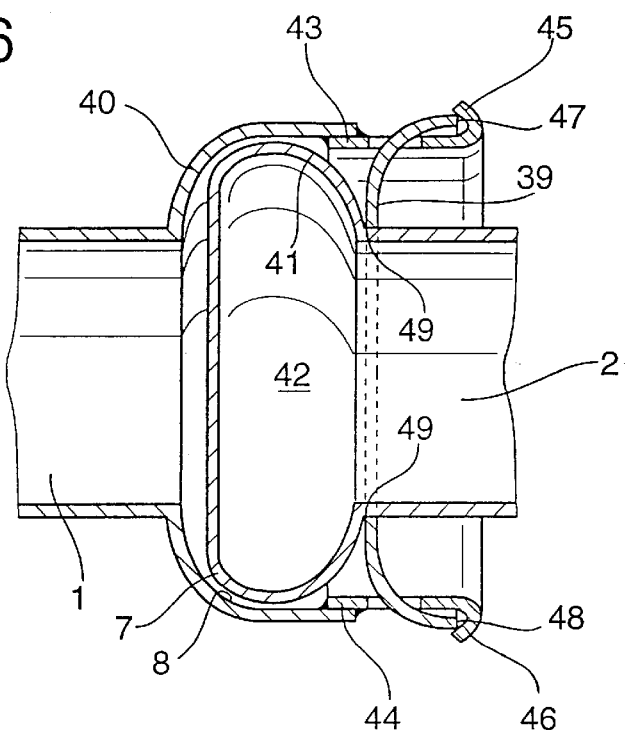
FIG. 6 is a partial schematic side sectional view of an articulated connection constructed according to a third preferred embodiment of the present invention.

In FIG. 6, a third embodiment of the device according to the invention is shown with only one curved washer 39, with said spring simultaneously forming the flange-shaped connecting piece.

Two connecting pieces 40 and 41 form a ball joint 42 similar to the one described above (ball joint 9). Two spring-elastic or rigid clamps 43 and 44 are permanently attached to connecting piece 40, said clamps engaging clamp hooks 45 and 46 in receptacles 47, 48 in curved washer 39, which simultaneously forms the flange-shaped connecting piece. Curved washer 39 is associated with connecting piece 41 and abuts clamps 43 and 44 in its bearing 49 in addition to curved washer 39. The clamping means of curved washers 39 in this embodiment are therefore clamps 43 and 44.

Figure 7:
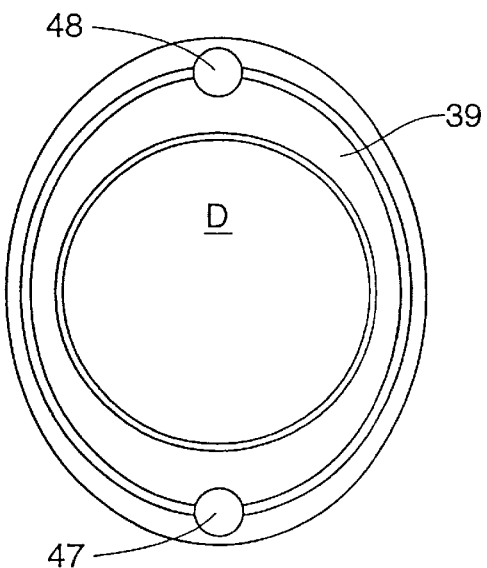
FIG. 7 is a first view of the curved washer in FIG. 6.
Figure 8:
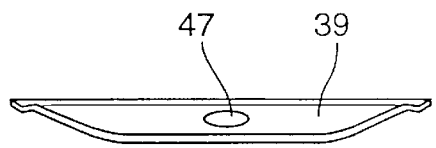
FIG. 8 is a second view of the curved washer in FIGS. 6 and 7.

FIGS. 7 and 8 show two views of curved washers 39 with receptacles 47, 48 for clamp hooks 45, 46 in FIG. 6.

The invention is not limited to the embodiments shown. It is especially applicable to substantially rigidly connected pipes (in which therefore no, or no significant, pivot angle α is possible between the two conducting parts).

The spring characteristic of the pipe connection according to the invention is adjustable, in addition to the thickness of the curved washers, by means of a series connection of springs. For the latter, on a connecting piece or on both connecting pieces, a plurality of curved washers is assembled arranged side by side in series, with the outermost curved washer being surrounded by the clamp so that the pipe connection is pressed together.

The invention comprises, in terms of the pipes to be connected, any pipe cross sections (for example circular, oval, or polygonal pipe cross sections), any pipe diameter (from 0.1 to 7000 nm for example) and pipe materials (metal, plastic, or hard rubber for example). Of course, in the conducting parts to be connected, a conducting part can also be formed as a stub molded directly on an inlet or outlet of the internal combustion engine.

In addition, the conducting parts to be connected can also be at an angle to one another so that the lengthwise axes of the two conducting parts intercept.

Moreover the clamping springs can be provided with crimps S (see FIG. 4) to reinforce the clamps and/or can have an internal crown shape. In particular, additional embodiments with integral clamps are possible, both in embodiments with one and those with two or more curved washers. Instead of the clamps, as already mentioned above, bolts or similar tensioning means can be used according to other contemplated advantageous embodiments.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An articulated pipe connection arrangement for connecting first and second pipes to one another, said connection arrangement comprising:
   a first spherical connecting piece carried by said first pipe and having a clamping abutment surface operably acting on the second pipe;
   a second spherical connecting piece carried by said second pipe and abuttingly engageable with the clamping abutment surface of the first spherical connection piece when said first and second pipes are connected together;
   a first spring clamping assembly surrounding said first pipe, the first spring clamping assembly including a first clamping member and a first clamp receptacle;
   a second spring clamping assembly surrounding said second pipe, the second spring clamping assembly including a second clamping member and a second clamp receptacle;
   said first clamping member detachably engaging with said second clamp receptacle and said second clamping member detachably engaging with said first clamp receptacle, with the first and second clamping assemblies acting to press the first and second spherical connecting pieces together.

2. The articulated pipe connection arrangement according to claim 1, wherein said second spring clamping assembly is disposed diametrically opposite said first spring clamping assembly.

3. The articulated pipe connection arrangement according to claim 2, wherein said first and second spring clamping assemblies are similar.

4. The articulated pipe connection arrangement according to claim 1, wherein the first clamping assembly is a curved washer surrounding the first pipe.

5. The articulated pipe connection arrangement according to claim 4, wherein said second spring clamping assembly is disposed diametrically opposite said first spring clamping assembly, and the second clamping assembly is a second curved washer which surrounds the second pipe.

6. The articulated pipe connection arrangement according to claim 5, wherein said first and second spring clamping assemblies are similar.

7. The articulated pipe connection arrangement according to claim 1, wherein the first and second spherical connecting pieces together form a ball joint that permits an angular movement of the two pipes relative to one another around a lengthwise axis, a vertical axis, and a transverse axis, with said connecting pieces along with said first and second spring clamping assemblies being configured to permit a pivot angle for the angular movement of the two pipes relative to one another in the range from zero to 40°.

8. The articulated pipe connection arrangement according to claim 1, wherein said first pipe includes an axially fixed abutment flange which is engageable on a first axially facing surface by said first clamping member and on a second axially oppositely facing surface by the first spherical connecting piece, the first spherical connecting piece being supported on an end extension of said first pipe which faces said second pipe when in an in use connected position of said pipes.

9. The articulated pipe connection arrangement according to claim 8, wherein said first clamping assembly is a curved washer surrounding the first pipe and engaging the first axially facing surface of said flange.

10. The articulated pipe connection arrangement according to claim 8, wherein the second spring clamping assembly is disposed diametrically opposite said first spring clamping assembly.

11. The articulated pipe connection arrangement according to claim 10, wherein said first and second spring clamping assemblies are similar.

12. The articulated pipe connection arrangement according to claim 11, wherein said first clamping assembly is a curved washer surrounding the first pipe and engaging the first axially facing surface of said flange.

13. The articulated pipe connection arrangement according to claim 1, wherein a plurality of curved washers is assembled on at least one connecting piece to form a serial spring arrangement, with curved washers having a central opening for the associated pipe to pass through, wherein at least one of said curved washers forms said first clamping member.

14. An articulated pipe connection arrangement for connecting first and second pipes to one another, said connection arrangement comprising:
   a first spherical connection piece carried by said first pipe and having a clamping abutment surface operably acting on the second pipe;
   a second spherical connection piece carried by said second pipe and abuttingly engageable with the clamping abutment surface of the first spherical connection piece when said first and second pipes are connected together;
   a first curved washer surrounding said first pipe and having disposed thereon a first clamp and a first clamp receptacle arranged opposite to one another; and a second curved washer surrounding said second pipe and having disposed thereon a second clamp and a second clamp receptacle arranged opposite to one another;

wherein the first clamp detachably engages with the second clamp receptacle, the second clamp member detachably engages with said first clamp receptacle, and the first and second clamping assemblies act to press the first and second spherical connecting pieces together.

15. An articulated pipe arrangement for connecting first and second pipes to one another, comprising:

a first spherical connection piece carried by said first pipe;

a second spherical connection piece carried by said second pipe and abuttingly engageable with the first spherical connection piece when said first and second pipes are connected together; and a two part clamping assembly for pressing the first and second spherical connection pieces together, each of said two parts comprising:

an integrally formed connection piece including a curved washer portion which surrounds a respective one of said pipes, a clamp portion and a receptacle portion, said clamp portion and receptacle portion being located substantially opposite one another about the curved washer portion;

wherein a first of said two parts surrounds the first pipe in a first position and a second of said two parts surrounds the second pipe in a second position such that the clamp portion of the first part detachably engages into the receptacle portion of the second part and the clamp portion of the second part detachably engages into the receptacle portion of the first pipe.

16. The articulated pipe arrangement according to claim 15, wherein the first and second positions are rotatable about the first and second pipes.

17. The articulated pipe arrangement according to claim 15, wherein the clamp portion is an angular nose piece engageable with the receptacle portion.

18. The articulated pipe arrangement according to claim 15, wherein each part of the two part clamping assembly has a plurality of clamp portions and a plurality of receptacle portions disposed thereon.

19. The articulated pipe arrangement according to claim 18, wherein said plurality of clamp portions and said plurality of receptacle portions of each part are arranged opposite to one another, respectively.

* * * * *